United States Patent [19]

Kobayashi

[11] Patent Number: 4,724,818
[45] Date of Patent: Feb. 16, 1988

[54] INTAKE AIR CONTROL SYSTEM FOR AN INTERNAL COMBUSTION ENGINE

[75] Inventor: Tomoya Kobayashi, Fuchu, Japan

[73] Assignee: Fuji Jukogyo Kabushiki Kaisha, Tokyo, Japan

[21] Appl. No.: 2,152

[22] Filed: Jan. 12, 1987

[30] Foreign Application Priority Data

Jan. 4, 1986 [JP] Japan .................................. 61-5640

[51] Int. Cl.⁴ .............................................. F02M 23/04
[52] U.S. Cl. ...................................... 123/585; 123/588
[58] Field of Search ................................. 123/585–588

[56] References Cited

U.S. PATENT DOCUMENTS

| | | | |
|---|---|---|---|
| 4,599,980 | 7/1986 | Collonia | 123/585 |
| 4,660,533 | 4/1987 | Watabe et al. | 123/588 |
| 4,665,883 | 5/1987 | Amano et al. | 123/585 |
| 4,672,936 | 6/1987 | Abe | 123/588 |

FOREIGN PATENT DOCUMENTS 99029  6/1984  Japan .................................. 123/585

Primary Examiner—William A. Cuchlinski, Jr.
Attorney, Agent, or Firm—Martin A. Farber

[57] ABSTRACT

A bypass is provided around a throttle valve of an engine, and a solenoid operated on-off control valve provided in the bypass so as to control flow of intake air. When the engine is accelerated in the coasting of a vehicle, an acceleration signal is produced. In response to the acceleration signal, a driving pulse train is fed to the control valve so as to reduce the intake air flow in dependence on coolant temperature of the engine by the coolant temperature.

3 Claims, 16 Drawing Figures

FIG. 3
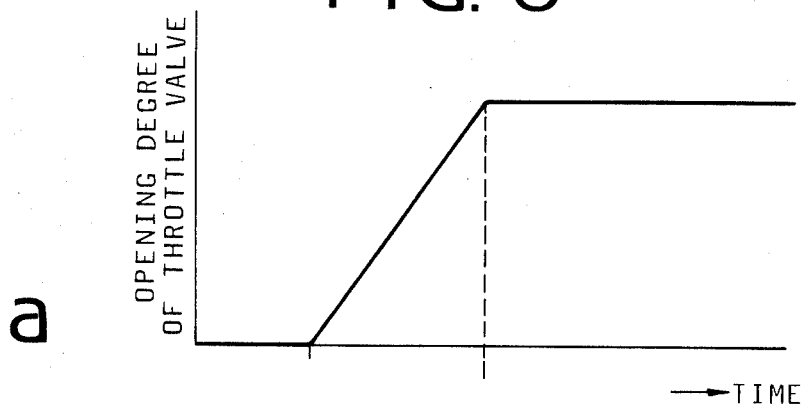
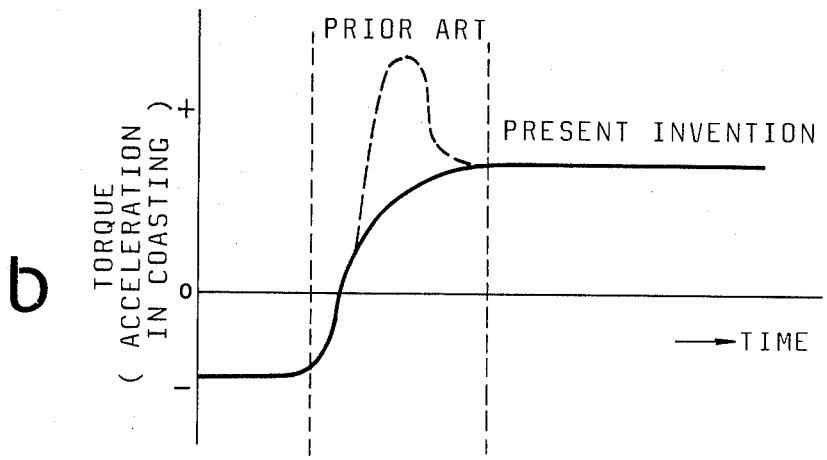
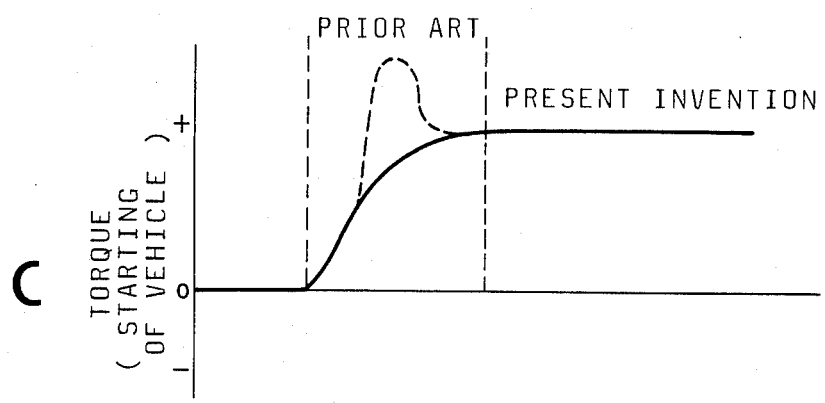

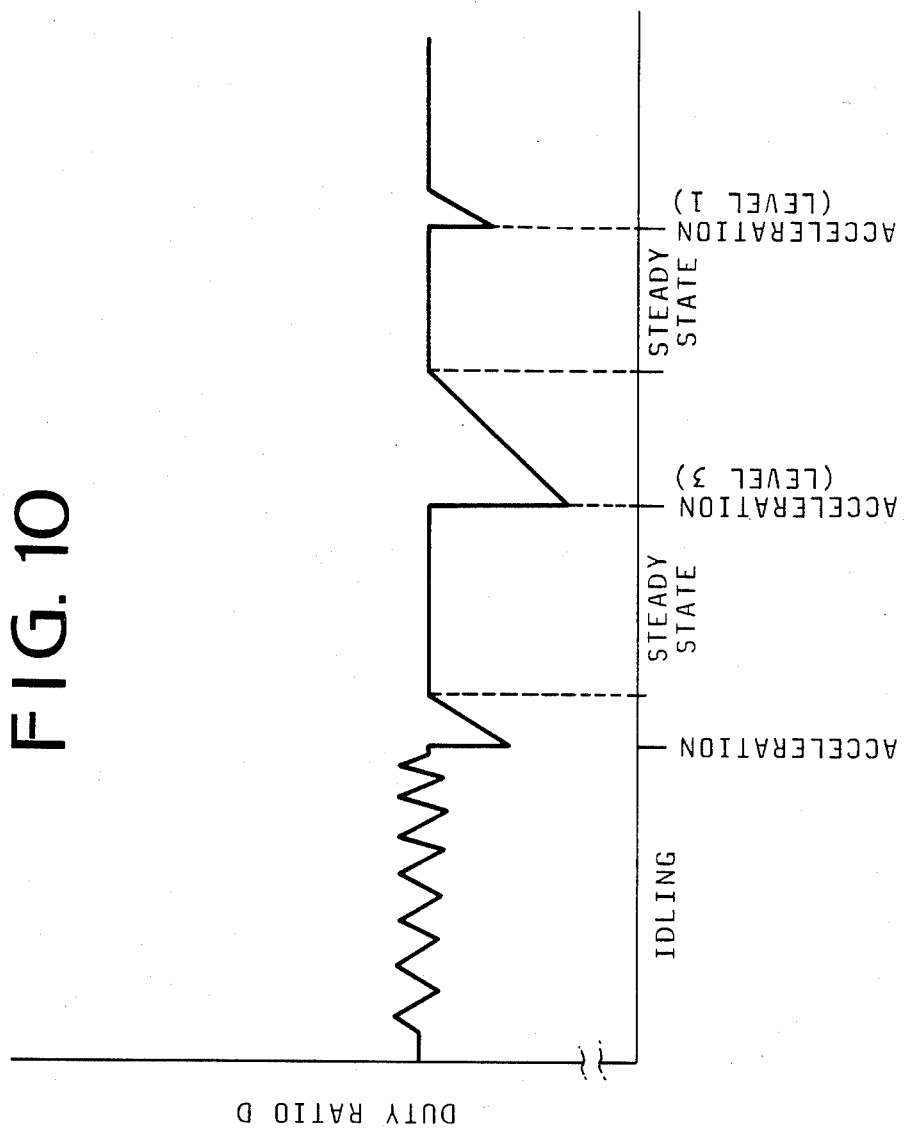

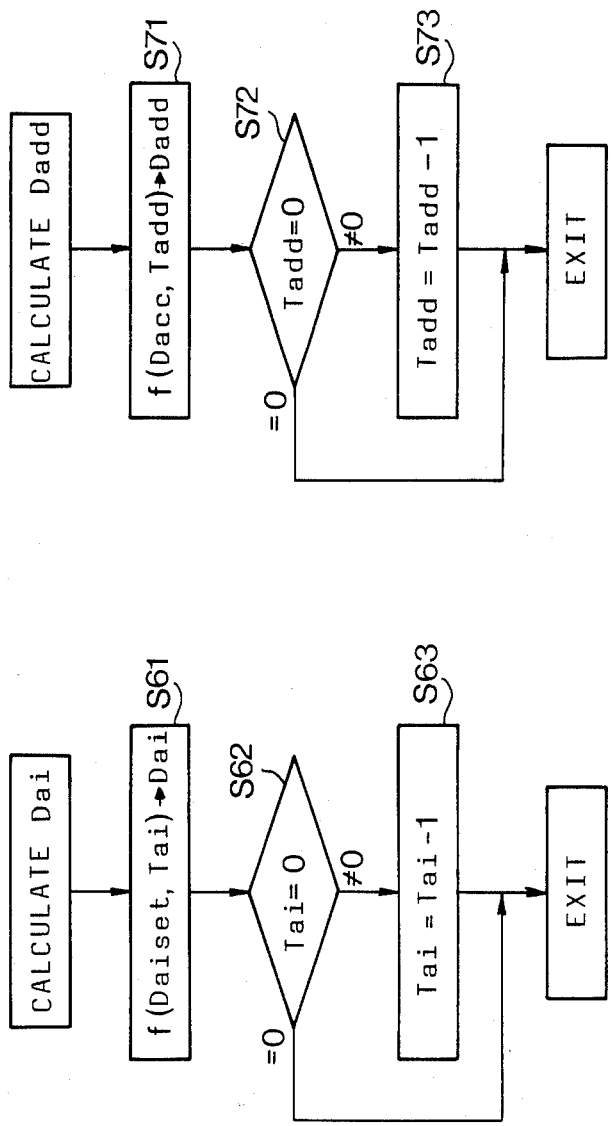

INTAKE AIR CONTROL SYSTEM FOR AN INTERNAL COMBUSTION ENGINE

BACKGROUND OF THE INVENTION

The present invention relates to a system for controlling the amount of intake air of an engine for a motor vehicle having a fuel injection system.

The amount of injecting fuel in an electronic fuel injection system for a vehicle is controlled in accordance with the amount of intake air measured by an air flow meter and with the speed of an engine. During the coasting of the vehicle, a throttle valve of the engine is closed to idle the engine. Accordingly, the amount of intake air is small, thereby reducing injected fuel. In the coasting state, when an accelerator pedal is depressed in order to re-accelerate the vehicle, the amount of intake air increases rapidly to increase the torque of engine. Dotted lines of FIGS. 3b and 3c show examples of sudden increases of the engine torque, which are caused by an increase of opening degree of a throttle valve shown in FIG. 3a. Such a sudden increase of engine torque causes jerk of the vehicle, which shocks the driver of the vehicle.

In order to solve the above described problems, heretofore, devices for delaying the operation of throttle valve by elongating the stroke of the accelerator pedal or by shaping a throttle cam to a particular shape have been employed. However, it is difficult to increase the stroke of the accelerator pedal due to structural conditions. On the other hand, the configuration of the cam for providing an irregular speed operation of the throttle valve causes irregular load of the accelerator pedal, that is, the load is light in a small throttle open range and heavy in a wide throttle open range.

SUMMARY OF THE INVENTION

The object of the present invention is to provide a system which may control flow rate passing through a bypass for a throttle valve at acceleration of an engine so as to prevent sudden increase of engine torque.

In accordance with the present invention, there is provided an intake air control system for an internal combustion engine comprising a bypass provided around a throttle valve of the engine, a control valve provided in the bypass so as to control flow of intake air, first means for detecting acceleration of the engine in idling condition of the engine, and for producing an acceleration signal, second means for detecting temperature of coolant of the engine and for producing a coolant temperature signal, and third means responsive to the acceleration signal for producing a drive signal for operating the control valve so as to reduce the intake air flow in dependence on the coolant temperature signal for a time decided by the coolant temperature signal. In an aspect of the invention, the control valve is a solenoid operated on-off valve, and the drive signal is a pulse train. The duty ratio of the pulse train is decided in accordance with the coolant temperature signal and opening degree of the throttle valve.

The other objects and features of this invention will be apparently understood from the following description with reference to the accompanying drawings.

BRIEF DESCRIPTION OF DRAWINGS

FIGS. 3a to 3c show variations of torque according to a variation of a throttle position;

FIG. 10 shows a variation of output duty ratio;

Figs. 11a to 13 are flowcharts showing operations of the system.

DETAILED DESCRIPTION OF THE PREFERRED EMBODIMENT

Figure 1:
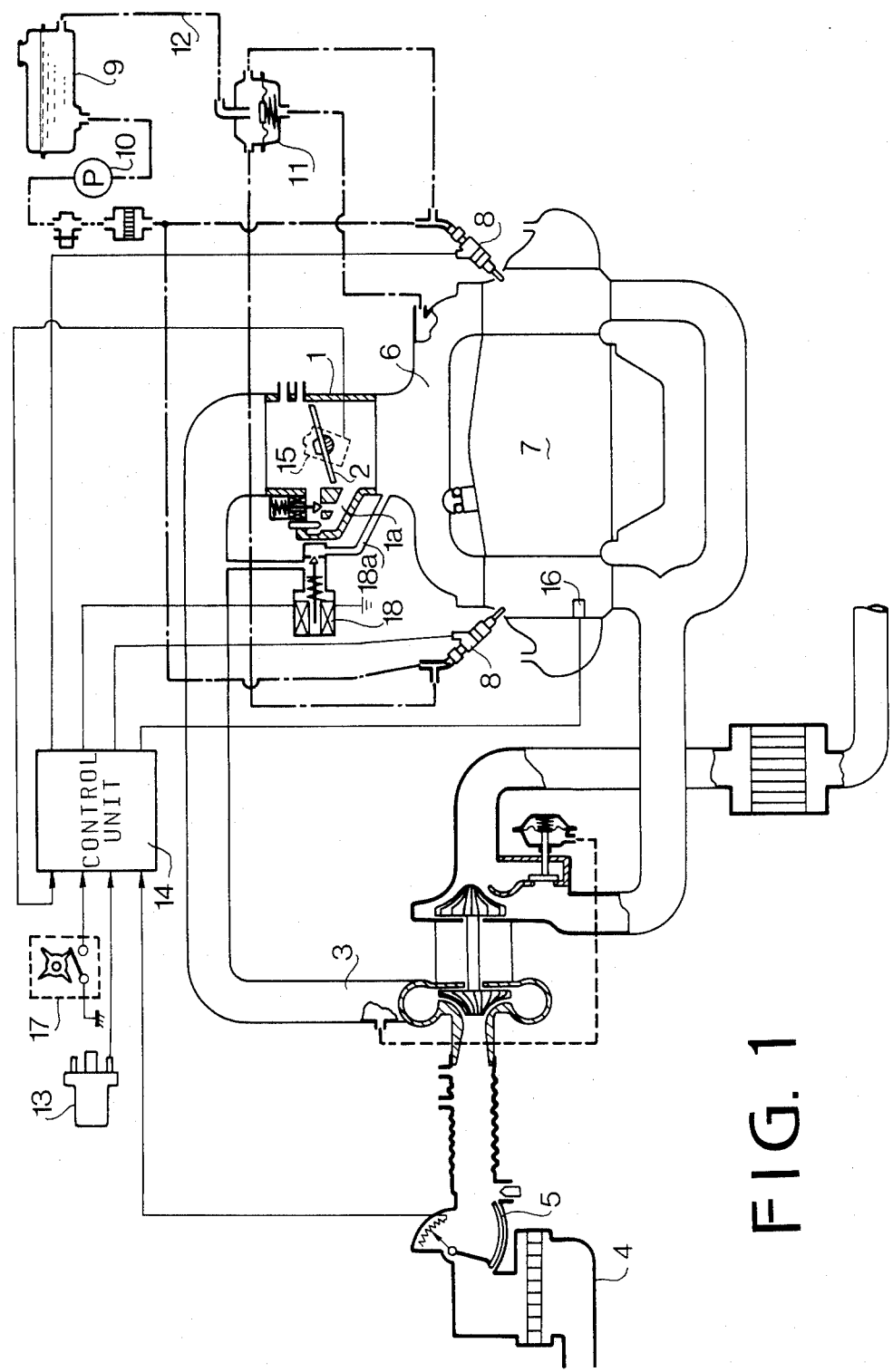
FIG. 1 is schematic diagram of a system of the present invention.

Referring to FIG. 1, an opposed-piston engine 7 for a motor vehicle has a throttle body 1 connected to an intake pipe 3 and an intake manifold 6, fuel injectors 8, and an air flow meter 5 at the downstream side of an air cleaner 4. Fuel in a fuel tank 9 is supplied to the injectors 8 by a fuel pump 10 and returned to the tank 9 through a pressure regulator 11 and a passage 12. Amount of injected fuel is decided by a width of fuel injection pulse which is applied from a control unit 14 in accordance with amount of inducted air measured by the airflow meter and with engine speed detected by a signal from an ignition coil 13. The pulse width is corrected by a signal from a coolant temperature sensor 16.

The throttle body 1 has a bypass 1a around a throttle valve 2, for controlling idling speed of the engine. In the system of the present invention, a bypass 18a is provided around the throttle valve 2 for controlling the inducted air at acceleration of the vehicle. In the bypass 18a, a solenoid operated on-off control valve 18 is provided for controlling the flow rate of inducted air. The control valve 18 is operated by pulses supplied from the control unit 14. Air flow passing the control valve reduces with reduction of the duty ratio of the pulses.

Figure 2:
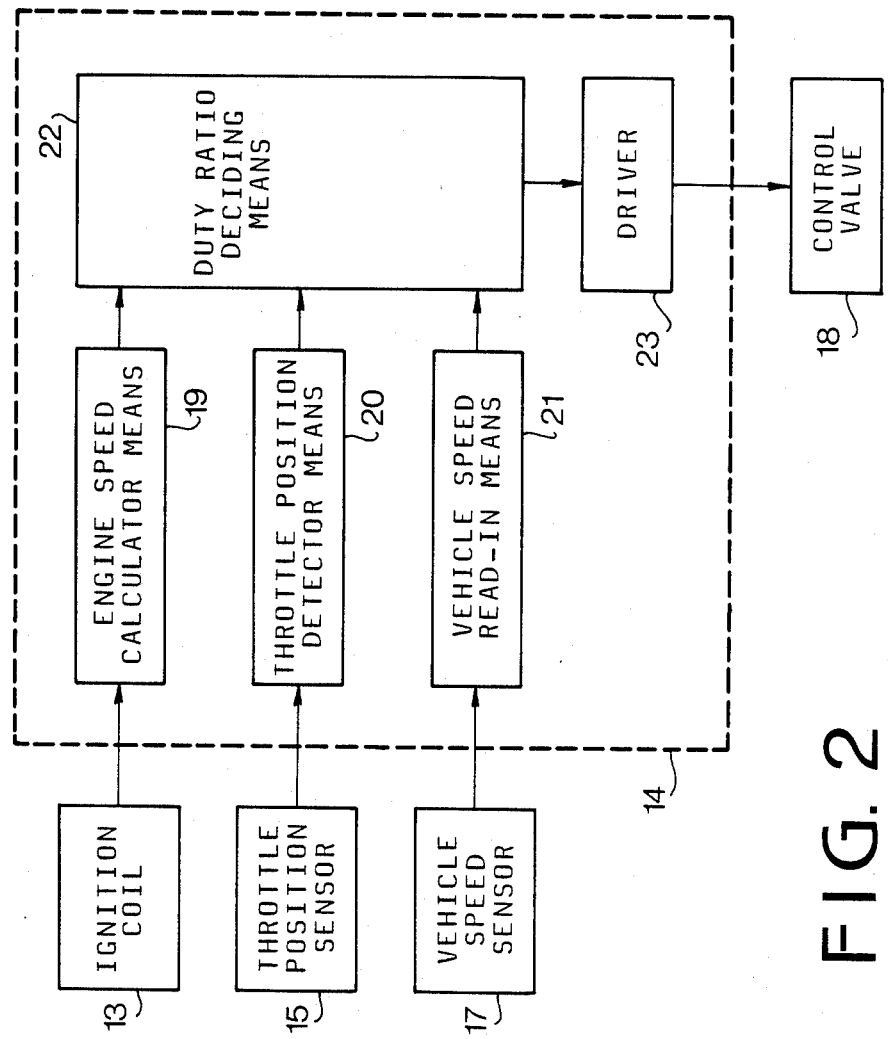
FIG. 2 is a block diagram showing a control system.

Referring to FIG. 2, an output signal of the ignition coil 13 is fed to an engine speed calculator means 19, an output signal of a throttle position sensor 15 is fed to a throttle position detector means 20, and an output signal of a vehicle speed sensor 17 is supplied to a vehicle speed read-in means 21. The output signal of the throttle position sensor is used for detecting idling of the engine (coasting) and acceleration load. Output signals of the means 19 to 21 are fed to a duty ratio deciding means 22 to produce a pulse train having a duty ratio decided by the input signals. The pulse train is applied to the control valve 18 through a driver 23 to operate the control valve. The duty ratio D is calculated by a following expression.

$$D = (D_{tw} + D_{ac} + D_{cac} + D_{fb} \text{ (or } D_{fb} + 1)) - D_{ctr}$$

where
$D_{tw}$ is a basic duty ratio,
$D_{ac}$ is a correcting duty ratio during the operation of an air conditioner of the vehicle,
$D_{cac}$ is a correcting duty ratio at a starting of the air conditioner,
$D_{fb}$ is a feedback correcting duty ratio at the stop of the air conditioner, Dfb+1 is a feedback correcting duty ratio at the start of the air conditioner, Dctr is a correcting duty ratio at the time when the throttle valve changes from a closed state to an open state.

When an accelerator pedal is depressed in a coasting state of the vehicle, the duty ratio D for deciding the flow of air passing through the control valve 18 is corrected by the correcting duty ratio Dctr for the throttle valve 2 in accordance with a following calculation.

$$Dctr = Dai \times Dadd$$

where

Dai is a correcting duty ratio dependent on the acceleration of the engine,

Dadd is a coefficient for the reduction of the duty ratio D.

The coefficient Dadd is calculated by a following expression.

$$Dadd = Dacc \times Kadd$$

where

Dacc is an initial acceleration coefficient,

Kadd is a throttle opening degree coefficient.

Figure 4:
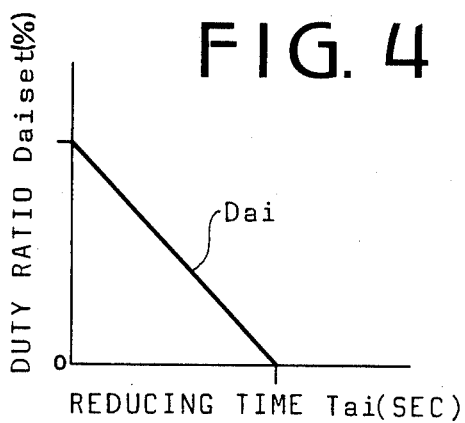
FIG. 4 is a graph showing a reduction of duty ratio.
Figure 5:
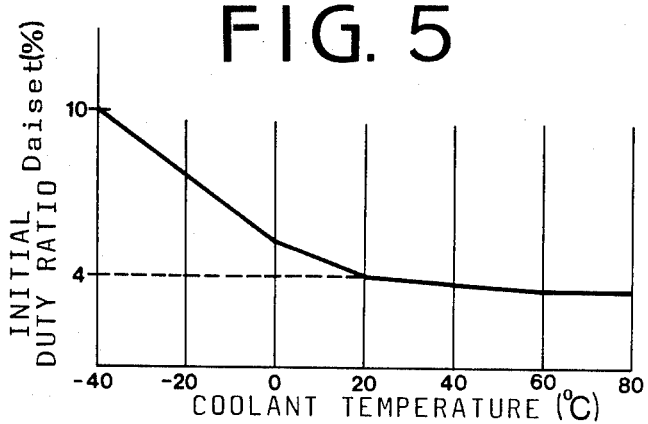
FIG. 5 is a graph showing a reduction of duty ratio with respect to coolant temperature.
Figure 6:
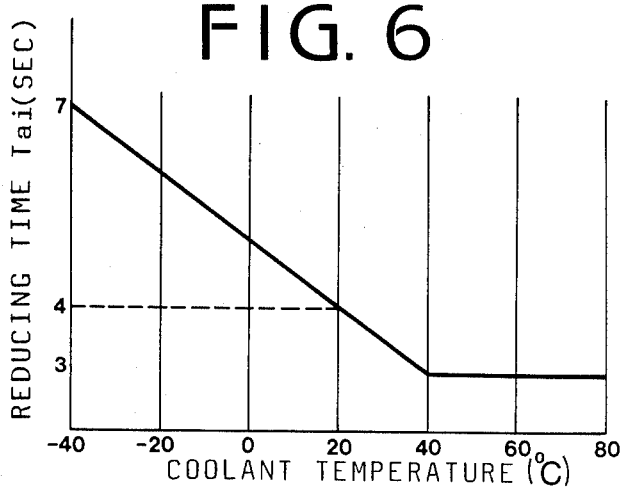
FIG. 6 shows a reducing time with respect to coolant temperature.

An initial value Daiset of the idling correcting duty ratio Dai is decided by the coolant temperature as shown in FIG. 5. The value Daiset reduces for a time Tai decided by the coolant temperature by the graph of FIG. 6. FIG. 4 shows an example of a decided initial value Daiset and a decided time Tai.

For example, when coolant temperature is at 20° C., the initial value Daiset is 4 percent and reducing time is 4 seconds.

The duty ratio reduction coefficient Dadd is divided into following three steps in accordance with increment ($\Delta$TH) of the opening degree (represented by voltage), for example in the period of 40 ms.

| Acceleration level | $\Delta$TH |
|---|---|
| 1 | 50 mV $\leq$ $\Delta$TH < 100 mV |
| 2 | 100 mV $\leq$ $\Delta$TH < 300 mV |
| 3 | 300 mV $\leq$ $\Delta$TH |

Figure 7:
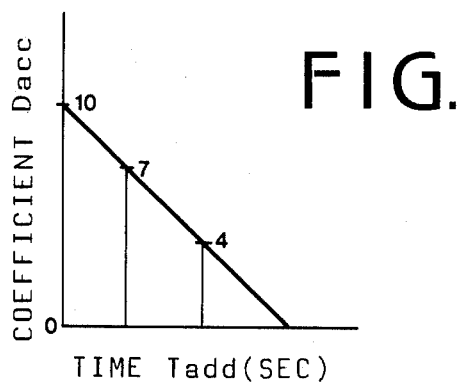
FIG. 7 shows a relationship between reduction initial value and time.
Figure 8:
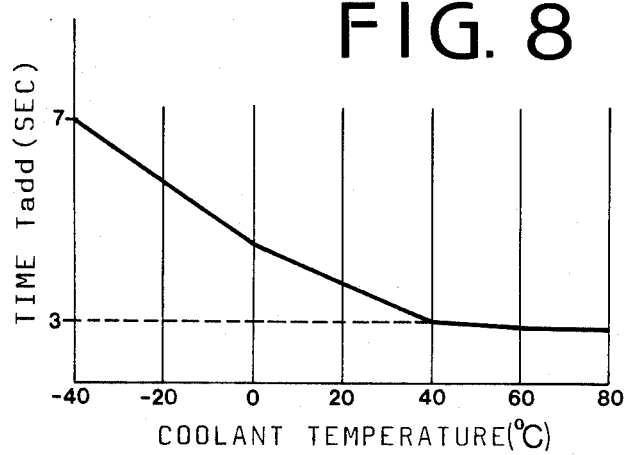
FIG. 8 shows a relationship between reducing time and coolant temperature.

The initial value Dacc is divided into three as shown in a following table in accordance with the acceleration level, and changes as shown in FIG. 7 dependent on reducing time Tadd of FIG. 8.

| Acceleration level | Initial Value Dacc |
|---|---|
| 1 | 4 |
| 2 | 7 |
| 3 | 10 |

Figure 9:
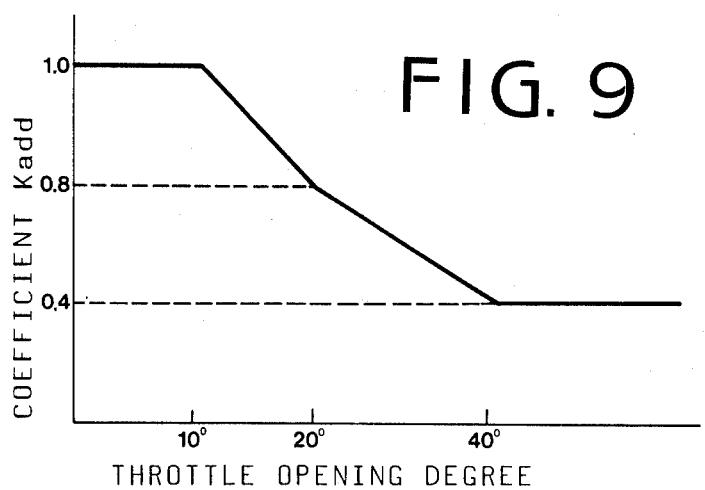
FIG. 9 shows a relationship between correcting coefficient and throttle position.

The throttle opening degree coefficient Kadd changes in accordance with the throttle opening degree as shown in FIG. 9.

Thus, the idling correcting duty ratio Dai and coefficient Dadd are decided by throttle opening degree, coolant temperature, acceleration signal and acceleration level, so that the correcting duty ratio Dctr is calculated. In accordance with the correcting duty ratio Dctr, the duty ratio D changes as shown in FIG. 10. More particularly, when the vehicle is started or accelerated in the coasting, air flow passing through the air control valve 18 is reduced at the beginning of the opening of the throttle valve to prevent rapid increase of the inducted air. Accordingly, torque gradually increases as in FIGS. 3b and 3c.

Figure 11A:
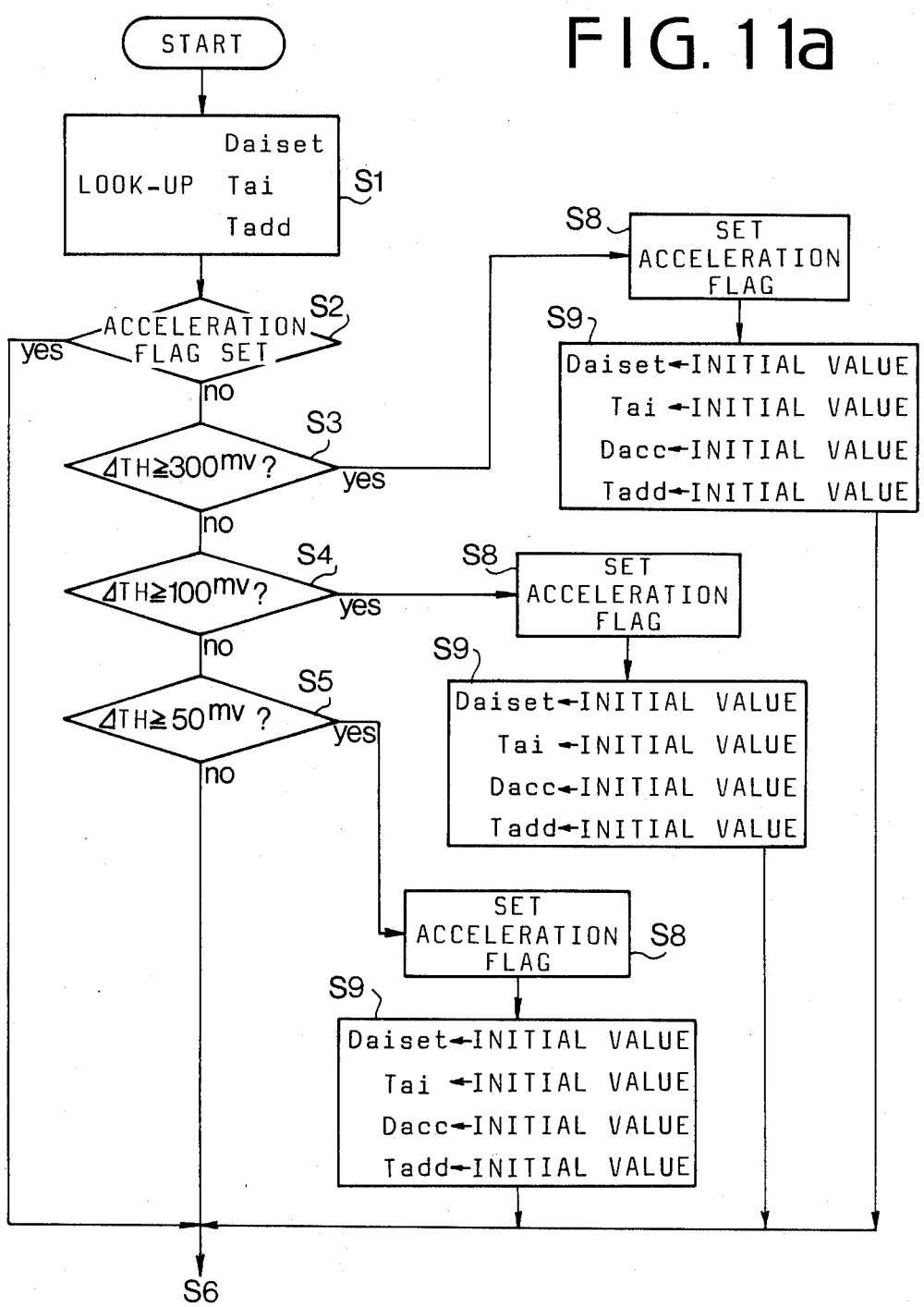
Figure 11B:
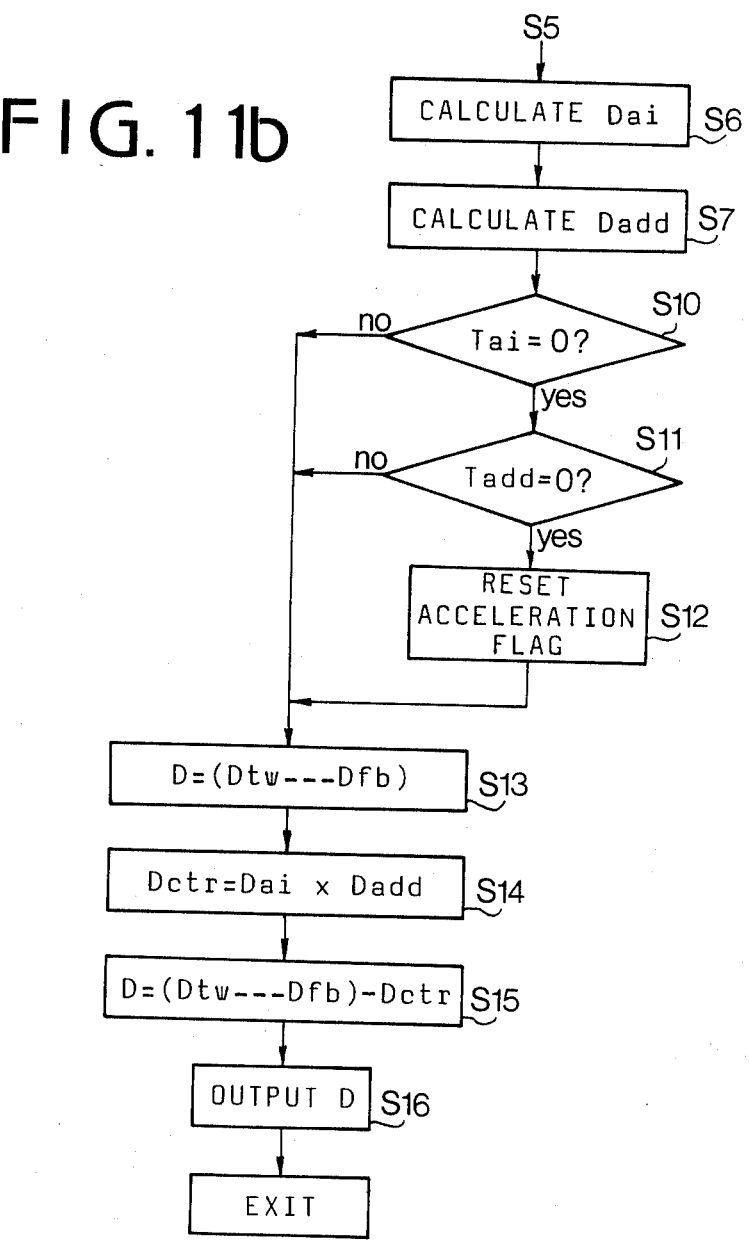

The operation of the system is described hereinafter. Referring to FIGS. 11a, and 11b initial value Daiset, time Tai and Tadd are looked up in accordance with coolant temperature at a step S1. At a step S2, it is decided whether acceleration flag is set (the vehicle was accelerated at the preceding program). If no flag is set, acceleration level is decided at steps S3, S4 and S5. If the vehicle is accelerated, the acceleration level is decided and a flag is set at one of steps S8 and initial value Daiset and Dacc, time Tai and Tadd are set at one of steps S9 in accordance with the decided acceleration level. At a step S6, Dai is calculated in accordance with a routine of FIG. 12. At a step S7, Dadd is calculated in accordance with a routine of FIG. 13. Thereafter, at steps S10 and S11, it is decided whether Taiset is zero and Tadd is zero. When both times are zero, which means that the acceleration finished, the acceleration flag is reset at a step 12. At a step S13, engine idling speed is controlled. At a step S14, the computation Dctr=Dai$\times$Dadd is made, and the computation D=(Dtw+Dac+Dcac+Dfb)−Dctr is made at a step S15. Thereafter, the duty ratio D is produced at a step S16.

While the presently referred embodiment of the present invention has been shown and described, it is to be understood that this disclosure is for the purpose of illustration and that various changes and modifications may be made without departing from the spirit and scope of the invention as set forth in the appended claim.

What is claimed is:

1. An intake air control system for an internal combustion engine comprising:

a bypass provided around a throttle valve of the engine;

a control valve provided in the bypass so as to control flow of intake air;

first means for detecting acceleration of the engine in idling condition of the engine, and for producing an acceleration signal;

second means for detecting temperature of coolant of the engine and for producing a coolant temperature signal; and third means responsive to the acceleration signal for producing a drive signal for operating the control valve so as to reduce the intake air flow in dependence on the coolant temperature signal for a time decided by the coolant temperature signal.

2. The control system according to claim 1 wherein the control valve is a solenoid operated on-off valve, and the drive signal is a pulse train.

3. The control system according to claim 2 wherein duty ratio of the pulse train is decided in accordance with the coolant temperature signal and opening degree of the throttle valve.

* * * * *